(12) United States Patent
Acharya et al.

(10) Patent No.: US 7,136,515 B2
(45) Date of Patent: Nov. 14, 2006

(54) METHOD AND APPARATUS FOR PROVIDING A BINARY FINGERPRINT IMAGE

(75) Inventors: Tinku Acharya, Chandler, AZ (US); Bhargab B. Bhattacharya, Calcutta (IN); Partha Bhowmick, Durgapur, IN (US); Arijit Bishnu, Calcutta (IN); Jayanta K. Dey, Calcutta (IN); Malay K. Kundu, Calcutta (IN); Chivukula Anjaneya Murthy, Calcutta (IN)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 09/952,248

(22) Filed: Sep. 13, 2001

(65) Prior Publication Data

US 2003/0053666 A1    Mar. 20, 2003

(51) Int. Cl.
*G06K 9/00* (2006.01)
*G06K 9/62* (2006.01)

(52) U.S. Cl. .................... 382/125; 382/224
(58) Field of Classification Search ............. 382/115, 382/116, 124–128, 224–228; 340/553, 5.83; 235/380, 382, 382.5; 902/3–6; 358/474, 358/3.13
See application file for complete search history.

(56) References Cited

U.S. PATENT DOCUMENTS

| | | | | |
|---|---|---|---|---|
| 5,067,162 A | * | 11/1991 | Driscoll et al. | 382/126 |
| 5,583,659 A | * | 12/1996 | Lee et al. | 358/3.13 |
| 5,963,675 A | | 10/1999 | van der Wal et al. | |
| 5,974,163 A | | 10/1999 | Kamei | |
| 6,351,566 B1 | * | 2/2002 | Zlotnick | 382/237 |
| 6,757,081 B1 | * | 6/2004 | Fan et al. | 358/474 |

FOREIGN PATENT DOCUMENTS

| | | |
|---|---|---|
| FR | 2 582 831 A1 | 12/1986 |
| WO | WO 99/33018 A1 | 7/1999 |

OTHER PUBLICATIONS

Ratha, et al., "Adaptive Orientation-Based Feature Extraction in Fingerprint Images", XP 000539636, Pattern Recognition, vol. 28, No. 11, Nov. 28, 1995, pp. 1657-1671.

* cited by examiner

*Primary Examiner*—Vikkram Bali
(74) *Attorney, Agent, or Firm*—Paul E. Steiner (57) ABSTRACT

Embodiments of a method and/or apparatus to provide a binary image are disclosed.

12 Claims, 6 Drawing Sheets

| Preliminary Class | Possibility | Status |
|---|---|---|
| CR | Crest | Final |
| VA | Valley | |
| PL | Plateau | |
| CV | Crest/valley | Finalized in second pass |
| CP | Crest/plateau | |
| VP | Valley/plateau | |
| XX | Crest/valley/plateau | |

| CASE | $a$ | $b$ | GRAY LEVELS | CLASS OF P |
|---|---|---|---|---|
| 1 | + | + |  | PL |
| 2 | + | − |  | CR |
| 3 | + | 0 |  | CR |
| 4 | − | + |  | VA |
| 5 | − | − |  | PL |
| 6 | − | 0 |  | VA |
| 7 | 0 | + |  | VA |
| 8 | 0 | − |  | CR |
| 9 | 0 | 0 |  | UN |

FIG. 3

| Case | No. of classes in preliminary set | | | | Preliminary Class |
|---|---|---|---|---|---|
| | CR | VA | PL | UN | |
| 1 | 0 | 0 | 0 | 4 | XX |
| 2 | 0 | 0 | 1 | 3 | XX |
| 3 | 0 | 0 | 2 | 2 | XX |
| 4 | 0 | 0 | 3 | 1 | PL |
| 5 | 0 | 0 | 4 | 0 | PL |
| 6 | 0 | 1 | 0 | 3 | CV |
| 7 | 0 | 1 | 1 | 2 | VA |
| 8 | 0 | 1 | 2 | 1 | VP |
| 9 | 0 | 1 | 3 | 0 | PL |
| 10 | 0 | 2 | 0 | 2 | VA |
| 11 | 0 | 2 | 1 | 1 | VA |
| 12 | 0 | 2 | 2 | 0 | VA |
| 13 | 0 | 3 | 0 | 1 | VA |
| 14 | 0 | 3 | 1 | 0 | VA |
| 15 | 0 | 4 | 0 | 0 | VA |
| 16 | 1 | 0 | 0 | 3 | CV |
| 17 | 1 | 0 | 1 | 2 | CR |
| 18 | 1 | 0 | 2 | 1 | CR |
| 19 | 1 | 0 | 3 | 0 | CP |
| 20 | 1 | 1 | 0 | 2 | CV |
| 21 | 1 | 1 | 1 | 1 | CV |
| 22 | 1 | 1 | 2 | 0 | CV |
| 23 | 1 | 2 | 0 | 1 | CV |
| 24 | 1 | 2 | 1 | 0 | VA |
| 25 | 1 | 3 | 0 | 0 | VA |
| 26 | 2 | 0 | 0 | 2 | CR |
| 27 | 2 | 0 | 1 | 1 | CR |
| 28 | 2 | 0 | 2 | 0 | CR |
| 29 | 2 | 1 | 0 | 1 | CR |
| 30 | 2 | 1 | 1 | 0 | CR |
| 31 | 2 | 2 | 0 | 0 | CV |
| 32 | 3 | 0 | 0 | 1 | CR |
| 33 | 3 | 0 | 1 | 0 | CR |
| 34 | 3 | 1 | 0 | 0 | CR |
| 35 | 4 | 0 | 0 | 0 | CR |

FIG. 4

| Preliminary Class | Possibility | Status |
|---|---|---|
| CR | Crest | Final |
| VA | Valley | |
| PL | Plateau | |
| CV | Crest/valley | Finalized in second pass |
| CP | Crest/plateau | |
| VP | Valley/plateau | |
| XX | Crest/valley/plateau | |

FIGs. 6(a) Original image, 6(b) image after classification, 6(c) image with one-pixel-thick crest lines

METHOD AND APPARATUS FOR PROVIDING A BINARY FINGERPRINT IMAGE

RELATED APPLICATIONS

This patent application is related to concurrently filed U.S. patent application Ser. No. 09/952,249, titled "Method and Apparatus to Reduce False Minutiae from a Binary Fingerprint Image," filed on Sep. 13, 2001, by Acharya et at., and to concurrently filed U.S. patent application Ser. No. 09/952,276, titled "Architecture for Processing Fingerprint Images," filed on Sep. 13, 2001, by Acharya et al., both assigned to the assignee of the presently claimed subject matter and herein incorporated by reference.

BACKGROUND

This disclosure is related to classification and feature extraction.

Feature extraction is a current area of research and development in digital image processing and computer vision, particularly in areas of development involving feature based pattern recognition. Many image recognition, image detection, and biometrics applications, for example, have been developed based on techniques of feature extraction and pattern recognition. Feature extraction in fingerprint images has unique aspects compared to general purpose image processing applications at least in part due to its special topological characteristics. Most of the approaches proposed in the literature transform a fingerprint image into a binary image proposed in the literature transform a fingerprint image into a binary image based at least in part on convolution of the image with a filter coupled with certain variants of thresholding. However, this approach has several disadvantages, such as computational intensity and the inability to robustly address noisy images. A need, therefore, exists for other processing techniques.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

In one embodiment of the claimed subject matter, a technique of classifying a pixel may be based, at least in part, on its gray-scale topological relationship with neighboring pixels in a fingerprint image. In this particular embodiment, the pixel may be classified into one of four classes. These four classes, in this embodiment, are called crest, valley, plateau and undecided. Classification embodiments in accordance with the claimed subject matter may be further exploited to extract unique features of a gray-scale fingerprint image suitable for automatic fingerprint identification system (AFIS), as described, for example, in aforementioned concurrently filed U.S. patent application Ser. No. 09/952,249. Of course, the claimed subject matter is not limited in scope to being employed in this manner. This is just one example of a potential application of the claimed subject matter.

Fingerprint images have several unique topological features that may be applied for fingerprint recognition and identification. In a fingerprint image, there are curved contours, referred to in this context as ridge lines. Ridge lines correspond to minute elevations on the skin of the finger, that may, for example, end abruptly or split into two or more ridges. The points at which ridges end or split may be unique characteristics of a fingerprint and are called "minutiae" or "Galton characteristics" according to its observer, Sir Francis Galton. See, for example, F. Galton, *Fingerprints*, London: Macmillan, 1892. As is well-known, by correlating minutiae sets, an expert may match fingerprints. Several AFIS utilize minutiae matching techniques. See, for example, B. M. Metre, *Fingerprint Image Analysis for Automatic Identification*, Machine Vision and Applications, vol. 6, no. 2, pp. 124–139, 1993; V. S. Srinivasan and N. N. Murthy, *Detection of Singular Points in Fingerprint Images*, Pattern Recognition, vol. 25, no. 2, pp. 139–153, 1992; J. Hollingum, *Automated Fingerprint Analysis Offers Fast Verification*, Sensor Review, vol. 12, no. 13, pp. 12–15, 1992; B. M. Metre and B. Chatterjee, *Segmentation of Fingerprint Images—a Composite Method*, Pattern Recognition, vol. 22, no. 4, pp. 381–385, 1989; B. M. Mehtre and N. N. Murthy, *A Minutia Based Fingerprint Identification System*, in the Proceedings, Second International Conference on Advances in Pattern Recognition and Digital Techniques, Calcutta, 1986. Methods for pre-processing of fingerprint images are described in the literature, e.g., L. O'Gorman and J. V. Nickerson, *An approach to Fingerprint Filter Design*, Pattern Recognition, vol. 22, no. 1, pp. 29–38, 1989. However, these methods are typically slow, complicated, and/or difficult to implement in hardware. Furthermore, the process of automatic detection of minutiae may become more difficult when the quality of a fingerprint image degrades, such as due at least in part to noise.

Figure 1:
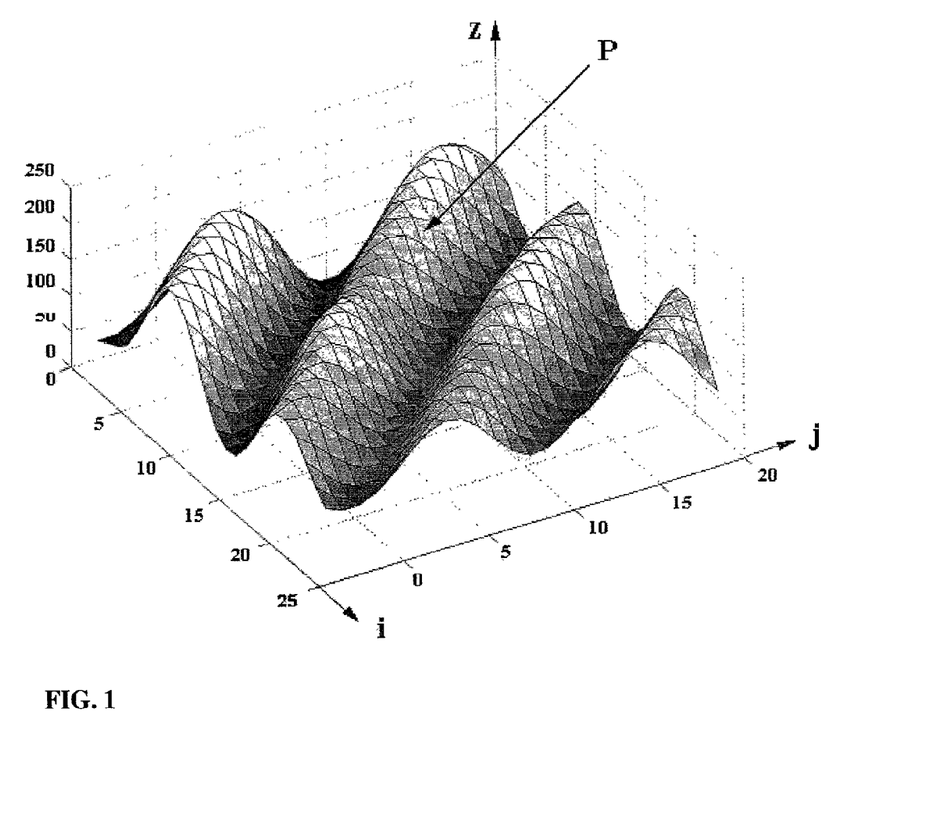
FIG. 1 is a perspective diagram of a gray-scale topology for a finger print image.

In this particular embodiment, the pixels in a fingerprint image may be classified as described in more detail hereinafter. Let I be an (m×n) gray-scale image with g gray levels. Let gray(i, j) be the gray level of the (i, j)-th pixel of I. This is denoted as P(i, j), where i=0, 1, . . . , m−1, and where j=0, 1, 2, . . . , n−1. An example of a discrete surface z=gray(i, j) that may correspond to such an image I is shown in FIG. 1. By associating bright pixels with gray levels close to g−1 and dark pixels with gray levels close to zero, the fingerprint ridge lines, appearing bright in image I, may correspond to surface ridges or crests, and the space between ridge lines, appearing dark in I, may correspond to ravines or valleys, as described in more detail hereinafter.

Figure 2:
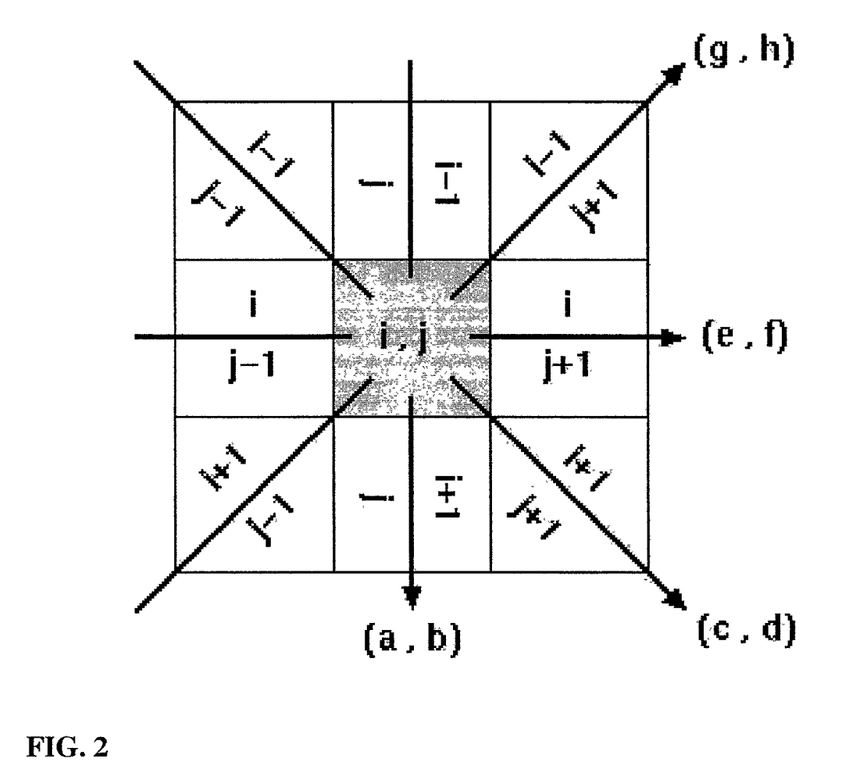
FIG. 2 is a schematic diagram of a pixel and its surrounding 8 pixel neighborhood.

Consider, for example, an eight-pixel neighborhood of P(i, j), in this particular embodiment.

Let, a=gray(i, j)−gray(i−1, j),
b=gray(i+1, j)−gray(i, j),
c=gray(i, j)−gray(i−1, j−1),
d=gray(i+1, j+1)−gray(i, j),
e=gray(i, j)−gray(i, j−1),
f=gray(i, j+1)−gray(i, j),
g=gray(i, j)−gray(i+1, j−1),
h=gray(i−1, j+1)−gray(i, j).

The relative gray-scale topological configuration of P in its locality may be be viewed from four possible directions as shown in FIG. 2. These are:
(a, b): from north to south,
(c, d): from north-west to south-east,
(e, f): from west to east, and,
(g, h): from south-west to north-east.

Furthermore, the eight parameters (a, b, c, d, e, f, g, h) may be positive (increasing gray-scale gradient), negative (decreasing gray-scale gradient), or substantially zero (substantially constant gray-scale gradient), and, therefore, may give rise to three cases. A consideration of the pair-wise properties of the eight parameters indicates that a pair of parameters may have nine (9) cases as laid out in FIG. 3.
For (a, b), consider P=(i, j), P'=(i−1, j), P"=(i+1, j).
For (c, d), consider P=(i, j), P'=(i−1, j−1), P"=(i+1, j+1).
For (e, f), consider P=(i, j), P'=(i, j−1), P"=(i, j+1).
For (g, h), consider P=(i, j), P'=(i+1, j−1), P"=(i−1, j+1).

Figure 3:
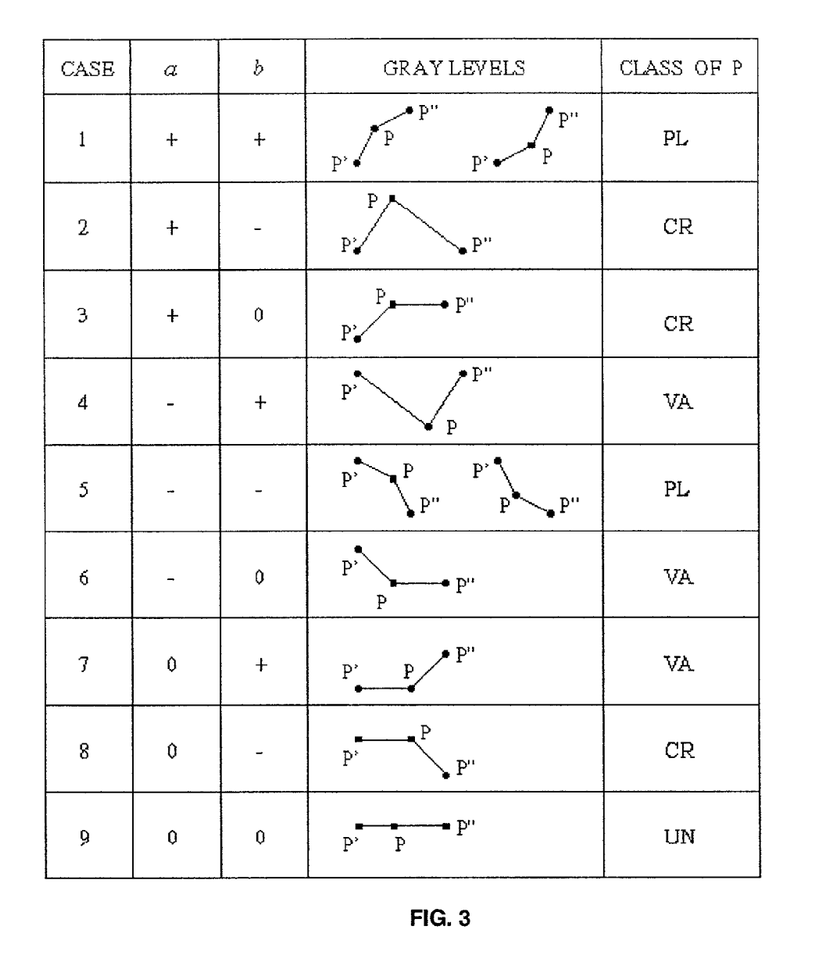
FIG. 3 is a table providing nine gray-scale topological possibilities for the directions (a, b), (c, d), (e, f), and (g, h), as shown in the neighborhood of FIG. 2.

The fourth column in FIG. 3, named "Gray Levels," exhibits the pictorial representation of the three points P, P', P", where P' and P" are the adjacent pixels of P in the concerned pair of parameters. The height of the point P in the pictorial representation, in FIG. 3, indicates the relative position of P in the gray-scale topology with respect to its two neighbors P' and P".

Now, in FIG. 2, for any pixel P(i, j) in the image I, evaluating the values of the four pairs of parameters indicates the topological configuration of P in its locality. As shown in the right column of FIG. 3, the value of the four pairs of parameters ((a, b), (c, d), (e, f), (g, h)) is used to assign one out of the following four classes to the respective pixel P:
(i) CR: P is a crest pixel if either the gray value of P is higher than the gray values of both P' and P" (e.g., case 2 in FIG. 3), or, the gray value of P is the same or nearly the same as that of one of P' and P", but higher than that of the other (e.g., case 3 and case 8).
(ii) VA: P is a valley pixel if either the gray value of P is lower than the gray values of both P' and P" (e.g., case 4), or, the gray value of P is the same or nearly the same as that of one of P' and P" but lower than that of the other (e.g., case 6 and case 7).
(iii) PL: P is a plateau pixel if the gray value of P lies strictly within the gray values of P' and P" (e.g., case 1 and case 5).
(iv) UN: P is an undecidable pixel if the gray values of P, P' and P" are the same or nearly the same (e.g., case 9).

Thus, in this embodiment, a pixel P is assigned to one of four preliminary classes depending, at least in part, on its relative topological position, guided by the values of the four parameter pairs along four directions, namely, north to south, north-west to south-east, east to west, and south-west to north-east. After this preliminary classification is made, P may be either strongly classified or weakly classified, as described in more detail hereinafter.

Figure 4:
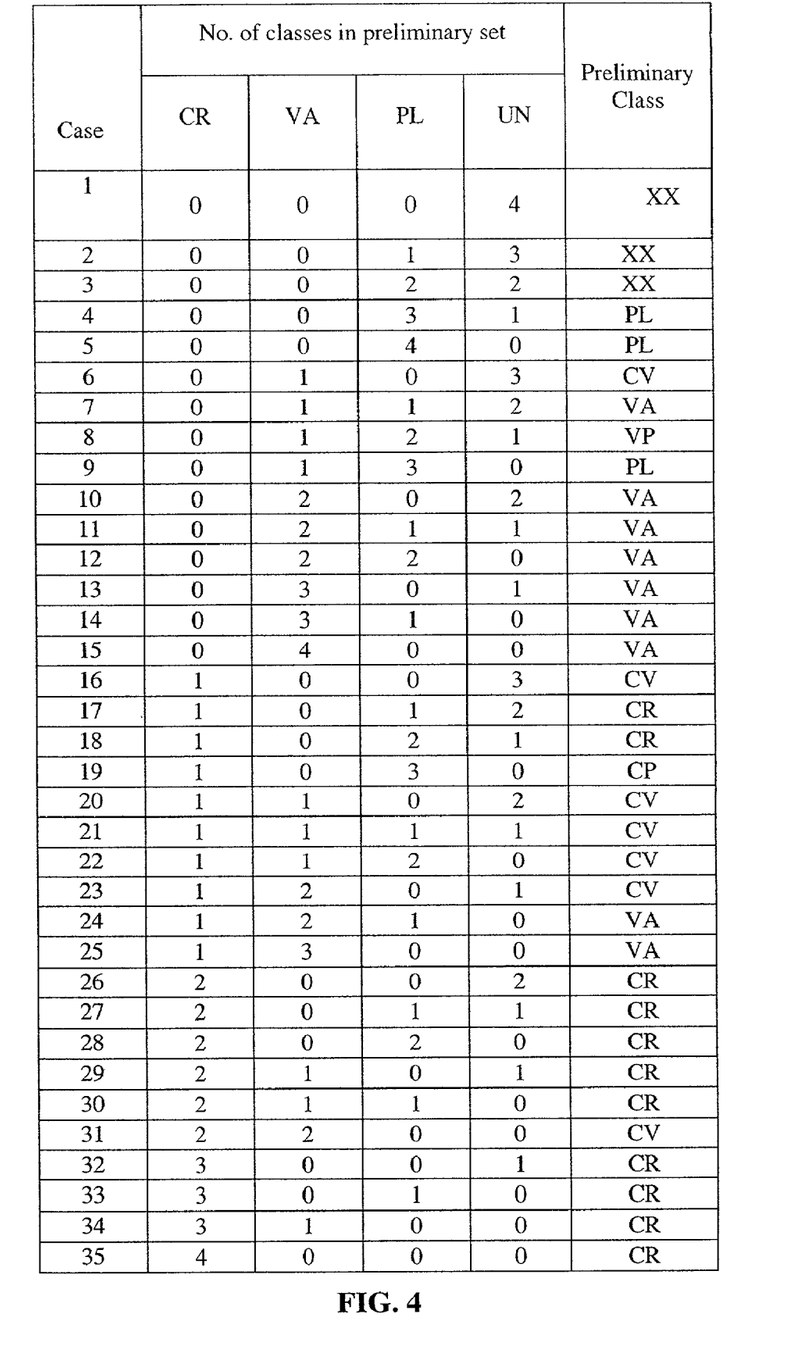
FIG. 4 is a table providing classifications of a pixel for an embodiment described herein.

Let $C_{ab}$, $C_{cd}$, $C_{ef}$ and $C_{gh}$ denote the four classes preliminarily assigned to P by the four pairs of parameters ((a, b), (c, d), (e, f), (g, h)). Note that these four classes are one of the four possible preliminary classes (CR, VA, PL and UN). In this particular embodiment, P is strongly classified to one of the classes among CR, VA and PL if three or four classes among $C_{ab}$, $C_{cd}$, $C_{ef}$ and $C_{gh}$ are the same. For instance, if the four classes preliminarily attached with P are {CR, PL, CR, CR}, then P is strongly classified as a crest (CR). Citing another, if P has a preliminary classification {VA, VA, UN, VA}, then P is strongly classified as a valley (VA). But, if P has got {UN, UN, UN, CR}, or has {CR, VA, CR, PL}, then P is not strongly classified in this embodiment. Therefore, P is said to be weakly classified when it fails to satisfy the criterion of strong classification. The table in FIG. 4 elucidates the possibilities of preliminary (first-pass) classification which is followed by a second or final classification of P, as described in more detail hereinafter, for this embodiment.

Figure 5:
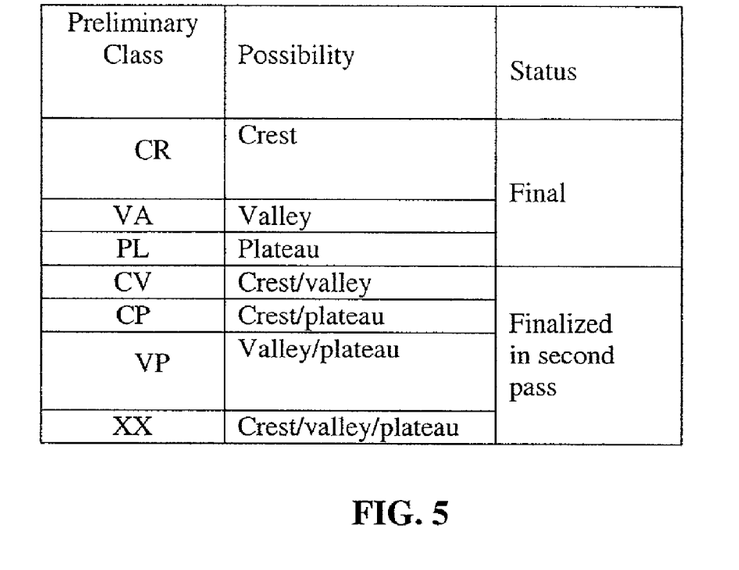
FIG. 5 is another table depicting relationships between preliminary and final pixel classifications for an embodiment described herein.

In FIG. 5, the semi-final or preliminary classes CR, VA and PL are effectively the final classes, for this particular embodiment. Note that the criteria of being strongly classified, mentioned previously, is satisfied by some of the cases in the table in FIG. 4, which are designated by unambiguous classes CR, VA, or PL. Pixels that are classified strongly in the first pass are treated as final in this particular embodiment.

For pixels not able to be unambiguously classified based, at least in part, on, for a particular pixel, at least some or all of the immediately adjacent pixels, the pixel is classified, in this particular embodiment, based, at least in part, on its gray-level value and the relationship of its gray-level value to the average gray-level value of the pixels that have been classified. Thus, the pixels, which are classified as a remaining class, here four ambiguous, preliminary classes (CV, CP, VP, XX) in this particular embodiment, are finally classified in the second pass, although, of course, the claimed subject matter is not limited in scope in this respect.

As is evident in FIG. 5, there may be four cases in this particular embodiment that cover the ambiguous classes. The implications of these ambiguous classes are indicated in the second column of the table of FIG. 5. In the second pass, from the unambiguously classified pixels in the first pass, the average gray values of three of the classes may be estimated. For example, in this embodiment, CR (crest or ridge), VA (valley or ravine), and PL (plateau which is neither crest nor valley) may be employed in this manner, as described in more detail hereinafter. These three average gray values may then be used to resolve the ambiguity of classification in the second pass. One possible technique, although, of course, the claimed subject matter is not limited in scope in this respect, the ambiguously classified pixel P may be classified unambiguously depending at least in part on the proximity of its gray value with the gray values for the three classes. For this embodiment, for example, P is classified into the class with which its gray value difference is smallest, or, to which its gray value is closest.

Below is provided a pseudo-code implementation of the previously described embodiment. Again, this implementation is provided merely as one possible embodiment within the scope of the claimed subject matter and is not intended to limit the scope of the appended claims.

Process A1: Preliminary Classification

Input:  1. original image ($image_{ori}$);
        2. image height (m);
        3. image width (n);
Output: intermediate image ($image_{int1}$);
Steps:
1.  for (i = 1 to m-2 by 1)
2.    for (j = 1 to n-2 by 1)
3.      evaluate the 8 parameters {a, b, c, . . ., g, h};
4.      evaluate {$C_{ab}$, $C_{cd}$, $C_{ef}$, $C_{gh}$};
5.      find the preliminary class $C_{pre}$ from FIG. 4;
6.      assign $C_{pre}$ to $image_{int1}[i][j]$;
7.    end for
8.  end for Process A2: Final Classification Input:  1. original image ($image_{ori}$);
        2. intermediate image ($image_{int1}$);
        3. image height (m);
        4. image width (n);
Output: image ($image_{int2}$);
Steps:
1.  initialize the average gray values of unambiguous classes:
    $CR_{avg} = 0$, $VA_{avg} = 0$, $PL_{avg} = 0$;
2.  for (i = 1 to m-2 by 1)
3.    for (j = 1 to n-2 by 1)
4.      if $image_{int1}[i][j]$ is equal to CR
5.        update $CR_{avg}$;
6.      else
7.        if $image_{int1}[i][j]$ is equal to VA
8.          update $VA_{avg}$;
9.        else
10.         if $image_{int1}[i][j]$ is equal to PL
11.           update $PL_{avg}$;
12.   end for
13. end for
14. for (i = 1 to m-2 by 1)
15.   for (j = 1 to n-2 by 1)
16.     if $image_{int1}[i][j]$ is equal to CV or CP or VP or XX
17.       find the class $C_{un}$ from {CR, VA, PL} such that
          $C_{un}$ has least gray value difference from
          $image_{int1}[i][j]$;
18.       assign gray value of $C_{un}$ to $image_{int1}[i][j]$;
19.   end for
20. end for
21. rename $image_{int1}$ as $image_{int2}$;

Application of this particular implementation to a fingerprint image may provide an $image_{int2}$ which contains 2 or 3 pixels thick ridge or crest lines, ravine or valley lines, and the rest plateau regions. It has been experimentally observed that gray scale fingerprint images may yield such results when this particular embodiment is applied, although in some cases pixel width may vary. It may be desirable to then thin $image_{int2}$ so that the ridge lines are one-pixel thick to represent the edges in the fingerprint image. Although the claimed subject matter is not limited in scope in this respect, a standard thinning technique, such as described, for example, in A. Rosenfield, A. C. Kak, *Digital Image Processing*, vol. 2, Academic Press Inc., Orlando, Fla., 1982, or in L. O'Gorman, *k×k Thinning*, Computer Vision, Graphics and Image Processing, pp. 195–215, 1990, may be applied. It is, of course, understood that any one of a number of possible techniques may be applied to accomplish this result and the claimed subject matter is not limited in scope to any particular technique.

Figures 6A, 6B, 6C:
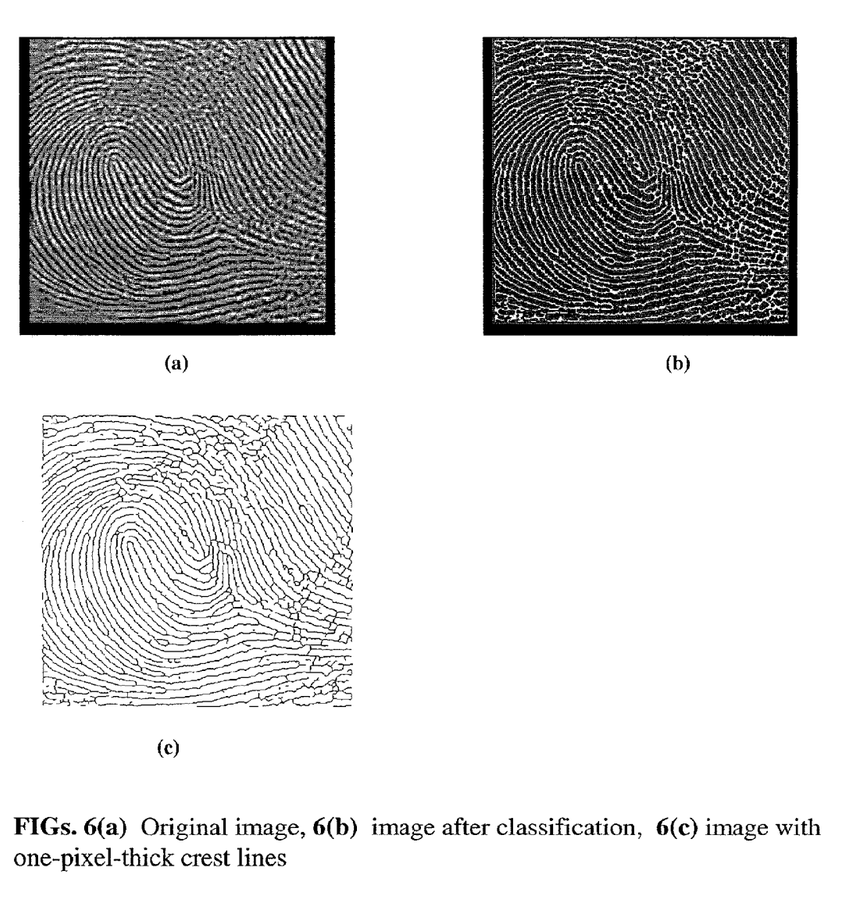
FIGS. 6(a), 6(b), and 6(c) are fingerprint images illustrating application of an embodiment described herein.

After thinning ridge lines in $image_{int2}$, $image_{int3}$ is produced which contains one-pixel thick ridge lines on a substantially uniform background. The ravines/valleys and the plateau regions are generally of use no longer as the minutiae are located on the crest lines and, therefore, in $image_{int3}$, these features are not retained. Thus, $image_{int3}$ is effectively a binary image where the ridge lines or crests have a substantially uniform gray value of 1 (object, here), and other pixels have a substantially uniformly gray value of 0 (background, here). Hence, this embodiment provides a binary fingerprint image. FIGS. 6(a),(b), and (c) provide sample fingerprint images that exhibit the different stages of processing of the gray-scale image.

The previously described embodiment provides a number of potential advantages, although, the claimed subject matter is not limited to the specific embodiment described or to the associated advantages. For example, as previously described, application of the previously described approach and variations thereof may be employed to extract topological features and produce a binary image from a gray-scale fingerprint image. This binary image may then be used for fingerprint analysis. Likewise, such a process is robust. Experimental results on the *Special Database*-14 of the National Institute of Standards and Technology (NIST), Gaithersburg, Md. 20899, USA show that the features may be extracted from noisy fingerprint images as well. For example, a noisy fingerprint gray tone image as in FIG. 6(a), yields a one-pixel-wide binary image as in FIG. 6(c). Likewise, such a technique and variants thereof may be extended to other applications and types of images. For example, it may be applied to edge detection for general image processing applications.

It will, of course, be understood that, although particular embodiments have just been described, the claimed subject matter is not limited in scope to a particular embodiment or implementation. For example, one or more of the processing embodiments described may be implemented in hardware, such as in an integrated circuit that processes a gray-scale fingerprint image, whereas another embodiment may, instead, be implemented in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which, when executed by a system, such as a computer system or platform, or a imaging or fingerprint image system, for example, may result in an embodiment of a method in accordance with the claimed subject matter being executed, such as an embodiment of a method of providing a binary fingerprint image, for example, as previously described. For example, an image processing platform or an image processing system may include an image processing unit, an image input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. A method of producing a binary fingerprint image from a gray-scale image having more than two gray-levels, said method comprising:
classifying individual pixels based, at least in part, on, for a particular pixel, the gray-level topological relationship with neighboring pixels;
wherein the individual pixels are classified into one of at least four classes, based, at least in part, on for a particular pixel, a gradient of the gray-level with all immediately adjacent pixels.

2. The method of claim 1, wherein three of the classes comprise: crest, plateau and valley.

3. The method of claim 1, and further comprising: for pixels not able to be unambiguously classified based, at least in part, on, for a particular pixel, at least some immediately adjacent pixels, classifying the pixel based, at least in part, on its gray-level value and the relationship of its gray-level value to the average gray-level value of the pixels that have been classified.

4. The method of claim 3, and further comprising:
processing the gray-scale image to provide ridge lines corresponding to the pixel classifications; and
thinning the ridge lines to be one pixel thick.

5. The method of claim 1, wherein said gray-scale image comprises a gray-scale fingerprint image.

6. An article comprising: a storage medium, said storage medium having stored thereon instructions, that, when executed, result in performance of a method of producing a binary image from a gray-scale image having more than two gray-levels, said method comprising: classifying individual pixels based, at least in part, on, for a particular pixel, the gray-level topological relationship with neighboring pixels.
wherein said instructions, when executed, result in classifying individual pixels in a manner wherein the individual pixels are classified into one of at least four classes, based, at least in part, on for a particular pixel, a gradient of the gray-level with all immediately adjacent pixels.

7. The article of claim 6, wherein said instructions, when executed, further result in, for pixels not able to be unambiguously classified based, at least in part, on, for a particular pixel, at least some immediately adjacent pixels, classifying the pixel based, at least in part, on its gray-level value and the relationship of its gray-level value to the average gray-level value of the pixels that have been classified.

8. The article of claim 7, wherein said instructions, when executed, further result in:
processing the gray-scale image to provide ridge lines corresponding to the pixel classifications; and
thinning the ridge lines to be one pixel thick.

9. The article of claim 6, wherein said instructions, when executed, result in performance of a method of producing a binary image from a gray-scale image.

10. apparatus comprising:
an integrated circuit, said integrated circuit being adapted to classify individual pixels of a gray-scale image having more than two gray-levels based, at least in part, on, for a particular pixel, the gray-level topological relationship with neighboring pixels, wherein said gray-scale image comprises a gray-scale fingerprint image,
and wherein said integrated circuit is further adapted to classify individual pixels in a manner wherein the individual pixels are classified into one of at least four classes, based, at least in part, on for a particular pixel, a gradient of the gray-level with all immediately adjacent pixels.

11. The apparatus of claim 10, wherein said integrate circuit is further adapted to, for pixels not able to be unambiguously classified based, at least in part, on, for a particular pixel, all immediately adjacent pixels, classify the pixel based, at least in part, on its gray-level value and the relationship of its gray-level value to the average gray-level value of the pixels that have been classified.

12. The apparatus of claim 11, wherein said integrated circuit is further adapted to:
process the gray-scale image to provide ridge lines corresponding to the pixel classifications; and
thin the ridge lines to be one pixel thick.

* * * * *

UNITED STATES PATENT AND TRADEMARK OFFICE
CERTIFICATE OF CORRECTION

| | | |
|---|---|---|
| PATENT NO. | : 7,136,515 B2 | Page 1 of 1 |
| APPLICATION NO. | : 09/952248 | |
| DATED | : November 14, 2006 | |
| INVENTOR(S) | : Acharya et al. | |

It is certified that error appears in the above-identified patent and that said Letters Patent is hereby corrected as shown below:

In column 8, at line 30, before "apparatus" insert --An--.

Signed and Sealed this

Sixth Day of November, 2007

JON W. DUDAS
*Director of the United States Patent and Trademark Office*